United States Patent [19]
Gillemot

[11] 4,084,067
[45] Apr. 11, 1978

[54] RE-ENTERABLE SPLIT CABLE SPLICE ENCLOSURE WITH LOCKING STRIPS AND COOPERABLE DETENT MEANS

[75] Inventor: George W. Gillemot, Santa Monica, Calif.

[73] Assignee: John T. Thompson, Los Angeles, Calif. ; a part interest

[21] Appl. No.: 679,815

[22] Filed: Apr. 23, 1976

Related U.S. Application Data

[60] Division of Ser. No. 580,201, May 23, 1975, abandoned, which is a continuation-in-part of Ser. No. 548,425, Feb. 10, 1975, abandoned, which is a continuation of Ser. No. 418,476, Nov. 23, 1973, abandoned.

[51] Int. Cl.² ............................................. H02G 15/18
[52] U.S. Cl. ....................................... 174/92; 174/41; 174/93; 285/303; 403/109
[58] Field of Search ................. 174/5 R, 41, 70 A, 76, 174/88 R, 91, 92, 93, 136, 138 F; 138/107; 285/302, 303, DIG. 4, DIG. 22; 403/109

[56] References Cited

U.S. PATENT DOCUMENTS

| | | | |
|---|---|---|---|
| 1,214,956 | 2/1917 | Rogers | 174/136 |
| 2,894,056 | 7/1959 | Bogese | 174/92 |
| 3,040,121 | 6/1962 | Gillemot | 174/93 |
| 3,153,693 | 10/1964 | Baxter et al. | 174/93 X |
| 3,428,742 | 2/1969 | Smith | 174/136 |
| 3,781,461 | 12/1973 | Thompson et al. | 174/93 |
| 3,785,682 | 1/1974 | Schaller et al. | 285/DIG. 4 X |

FOREIGN PATENT DOCUMENTS 368,839  6/1963  Switzerland ...................... 174/70 A

*Primary Examiner*—Laramie E. Askin
*Attorney, Agent, or Firm*—Harris, Kern, Wallen & Tinsley

[57] ABSTRACT

A re-enterable enclosure, or enclosure kit, for use with a cable splice, including two axially spaced, longitudinally split tubular members having inner and outer ends and converging toward their outer ends and having external radial locking ribs respectively extending longitudinally along the edges of the slits therein. A longitudinally split coupling sleeve is adapted to be telescoped over the inner ends of the tubular members. Each tubular member is adapted to be locked against circumferential expansion by a locking strip telescoped over the locking ribs of the corresponding tubular member from the outer end thereof. In an installation, wherein it is desirable to encapsulate the components within the enclosure in a potting compound, the tubular members and locking strips are spaced apart at their inner ends so that the slit in the coupling sleeve forms a potting compound charging port aligned with and located between the spaced inner ends of the locking strips, a suitable closure being provided to close the charging port after potting. In an installation wherein potting is not necessary, the inner ends of the tubular members and the inner ends of the locking strips may be brought into abutting relation. Detents are provided to hold the tubular members with their inner ends spaced apart if a charging port is desired, or in abutting relation if no charging port is necessary.

2 Claims, 13 Drawing Figures

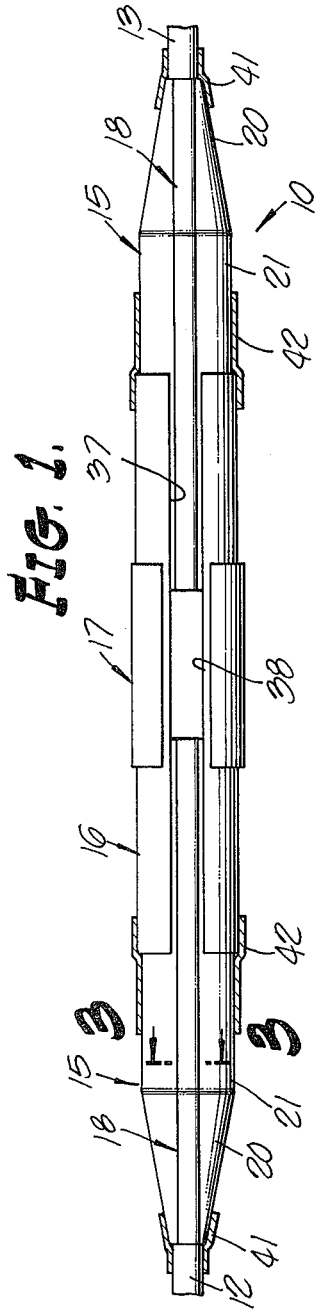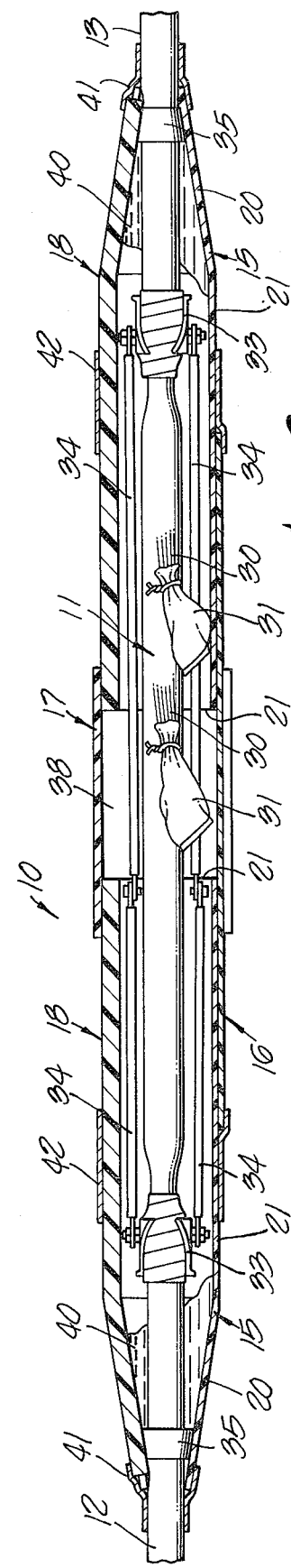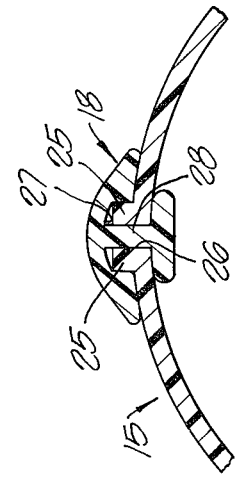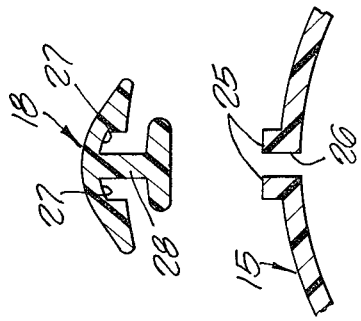

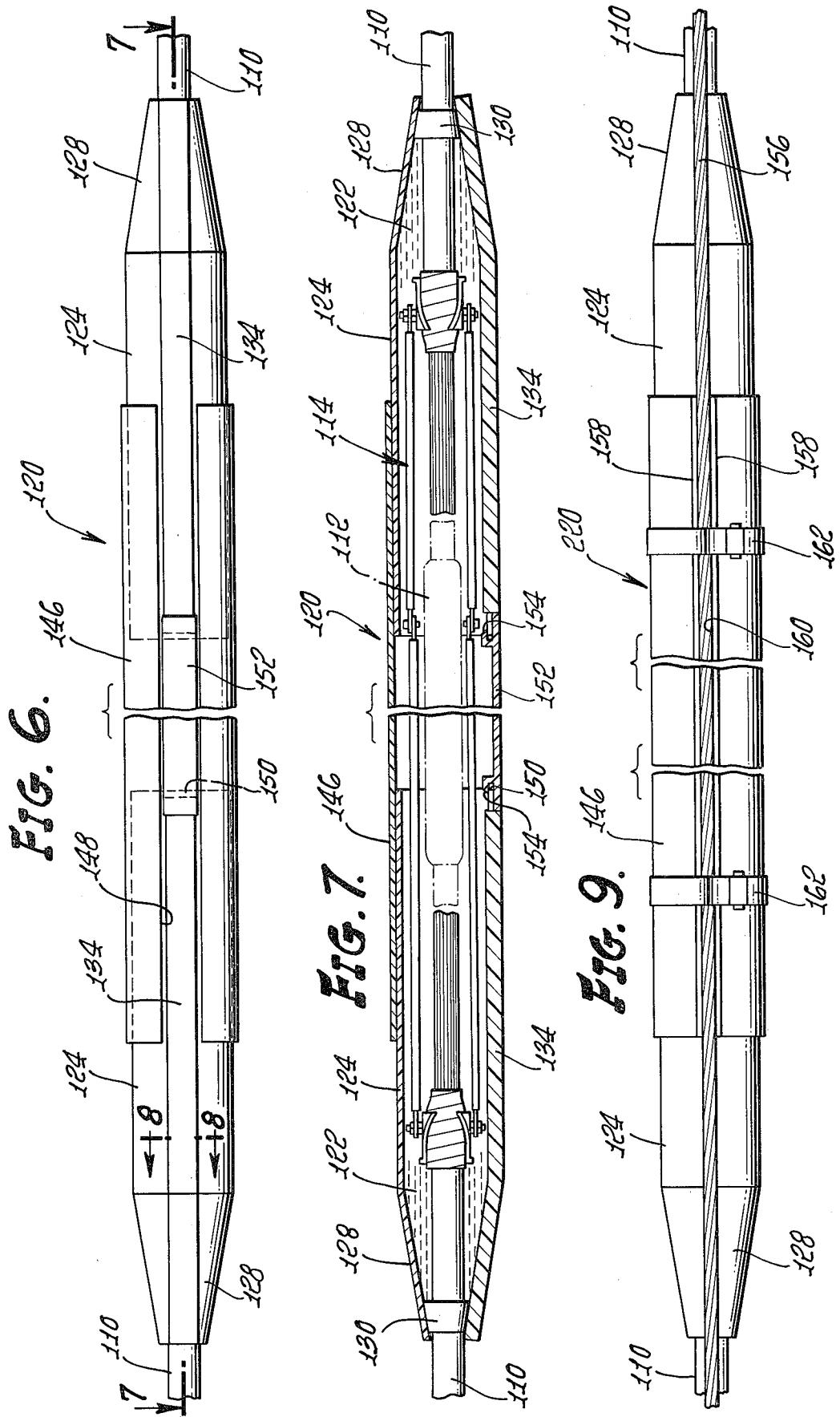

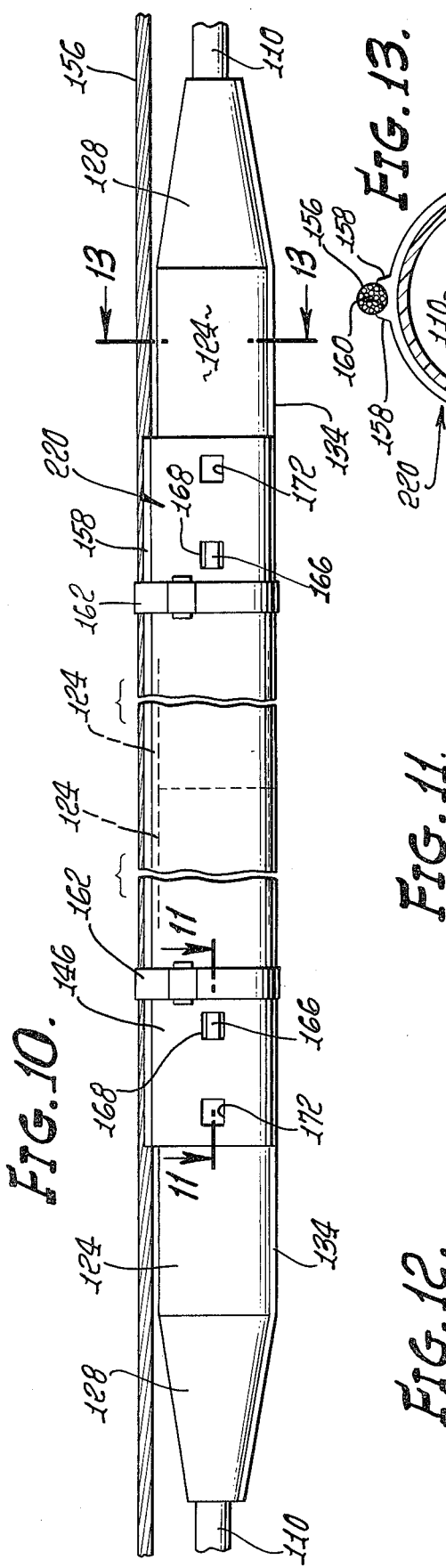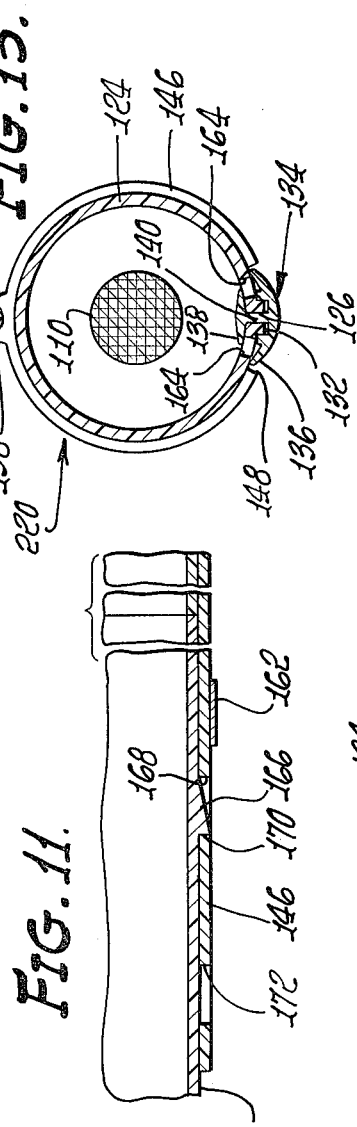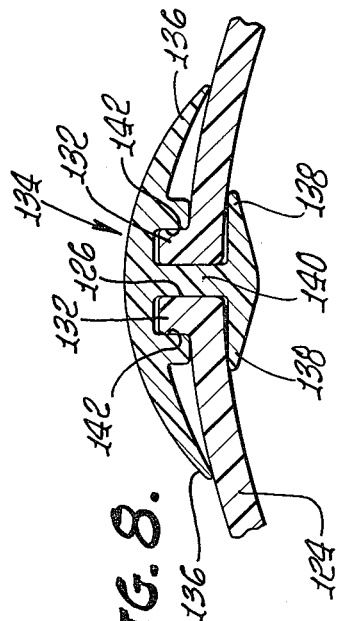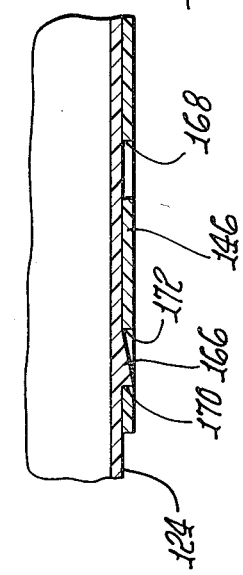

RE-ENTERABLE SPLIT CABLE SPLICE ENCLOSURE WITH LOCKING STRIPS AND COOPERABLE DETENT MEANS

CROSS-REFERENCE TO RELATED APPLICATIONS

This application is a division of application Ser. No. 580,201, filed May 23, 1975 (now abandoned), which is a continuation-in-part of application Ser. No. 548,425, filed Feb. 10, 1975 (abandoned), which in turn is a continuation of application Ser. No. 418,476, filed Nov. 23, 1973 (abandoned).

BACKGROUND OF INVENTION

The present invention relates in general to a readily re-enterable enclosure for a cable splice, or the like, and, more particularly, to an enclosure capable of lateral application to the cables and the splice interconnecting them.

Still more particularly, the invention relates to an enclosure which, in certain embodiments, can be charged with a removable compound for encapsulating or potting the components within the enclosure to seal them against the entry of moisture in underground or buried installations, and which, in other embodiments, can be used without an encapsulating or potting compound, as in an aerial installation.

SUMMARY AND OBJECTS OF INVENTION

The invention may be summarized as including, and an important object of the invention is to provide an enclosure, or enclosure kit, which includes, two longitudinally split tubular members having convergent outer ends and cylindrical inner ends and having external radial ribs respectively extending longitudinally along the edges of the slits therein, a longitudinally split coupling sleeve the ends of which are respectively telescopable over the inner ends of the tubular members, and two locking strips of generally H-shaped cross section slidably insertable into the slits in the tubular members from the outer ends thereof substantially to the inner ends thereof, said tubular members and said coupling sleeve being sufficiently flexible and resilient that the slits thereof may be spread to permit lateral insertion of the cable splice, or the cables adjacent the splice, and the coupling sleeve subsequently being telescopable over the inner ends of the tubular members, each locking strip including an outer leg and an inner leg interconnected lengthwise over their midportions by a web longitudinally insertable into the slit of the corresponding tubular member, the outer leg of each locking strip having outer flanges respectively grooved to snugly receive the radial locking ribs on the corresponding tubular member substantially from end to end thereof and positively preventing expansion of that tubular member, the inner leg of each of the locking strips having inner flanges respectively engaging the inner surface of the corresponding tubular member on opposite sides of the slit therein, the inner ends of the locking strips being disposed in the slit in the coupling sleeve.

Another important object of the invention, in an aerial installation, is to provide an enclosure of the foregoing nature wherein the inner ends of the tubular members and the inner ends of the locking strips respectively are in abutting relation with the locking strips facing downwardly, the tubular members being provided with drain holes adjacent the locking strips for the escape of any water which may enter the enclosure.

Still another important object is to provide the coupling sleeve, opposite the slit therein, with a cable receiving groove for the reception of a supporting cable for the enclosure, the components housed thereby, and adjacent portions of the associated cables.

Yet another important object of the invention, in underground or buried installations, is to provide the enclosure with a charging port for admitting a removable compound for encapsulating or potting the components within the enclosure. More particularly, an object in this connection is to provide an enclosure wherein the inner ends of the tubular members and the inner ends of the locking strips are spaced apart so that the slit in the coupling sleeve forms a charging port aligned with and located between the spaced inner ends of the locking strips. Still another object is to provide detent means on the tubular members and the coupling sleeve for holding these parts in assembled relation with the inner ends of the tubular members and the inner ends of the locking strips either in abutting relation, or in spaced relation, depending on whether the enclosure is to be used in an aerial environment, or in an underground or buried environment.

Another object is to provide means for closing the charging port after encapsulation or potting of the components within the enclosure through the charging port. An additional object in this connection is to provide a ported closure sleeve adapted to embrace the coupling sleeve and movable relative thereto from a position wherein the port in the closure sleeve registers with the charging port to a position wherein the port in the closure sleeve is out of register with the charging port, the port in the closure sleeve preferably being formed by a longitudinal slit in the closure sleeve, and the closure sleeve preferably being sufficiently flexible and resilient that it is capable of lateral application to the cable splice. An alternative object in this same connection is to provide a closure adapted to be snapped into the charging port to close same after potting or encapsulation of the components within the enclosure.

The foregoing objects, advantages, features and results of the present invention, together with various other objects, advantages, features and results which will be evident to those skilled in the art to which the invention relates in the light of this disclosure, may be achieved with the exemplary embodiments illustrated in the accompanying drawings and described in detail hereinafter.

DESCRIPTION OF DRAWINGS

FIG. 1 is a top plan view showing an illustrative embodiment of the re-enterable splice enclosure or housing of the invention assembled on a pair of spliced cables and with sealing tapes shown in cross section and a port closure member in open position, this embodiment being intended for use in an underground or buried environment;

FIG. 2 is a cross sectional view on an enlarged scale taken at right angles to the showing in FIG. 1 and showing a portion only of a potting compound and showing the closure member in closed position;

FIG. 3 is a fragmentary cross sectional view on an enlarged scale taken along line 3—3 of FIG. 1;

FIG. 4 is a cross sectional view on an enlarged scale of a locking strip per se;

FIG. 5 is a fragmentary cross sectional view on an enlarged scale of a portion of a tubular housing member provided with a slit;

FIG. 6 is a top plan view of another embodiment of the invention intended for use in an underground or buried environment;

FIG. 7 is a longitudinal sectional view taken as indicated by the arrowed line 7—7 of FIG. 6;

FIG. 8 is an enlarged, fragmentary sectional view taken as indicated by the arrowed line 8—8 of FIG. 6;

FIG. 9 is a top plan view of another embodiment of the invention intended for use in an aerial environment;

FIG. 10 is a side elevational view of the embodiment shown in FIG. 9;

FIG. 11 is an enlarged, fragmentary sectional view taken as indicated by the arrowed line 11—11 of FIG. 10 and showing a detent means in a position corresponding to the aerial enclosure of FIGS. 9 and 10;

FIG. 12 is a view similar to FIG. 11, but showing the detent means in a position corresponding to the underground or buried embodiment of FIGS. 6 and 7;

FIG. 13 is a transverse sectional view taken as indicated by the arrowed line 13—13 of FIG. 10 of the drawings.

DESCRIPTION OF EXEMPLARY EMBODIMENT OF INVENTION FIGS. 1 TO 5

Referring initially to FIGS. 1 and 2, there is shown an illustrative embodiment of the cable splice enclosure, designated generally 10, assembled about a splice 11 between a pair of aligned cables 12 and 13. The main components of the splice enclosure 10 include a pair of similar tubular members 15, a coupling member of sleeve 16, a closure member 17, and a pair of locking strips 18 having important functions and structural details to be described more fully presently. Housing tubes 15 preferably have tapering ends 20 integral with cylindrical portions 21 of the same diameter. These cylindrical portions face toward one another but are preferably spaced apart opposite the midportion of the splice 11. The tubes 15 are held in axial alignment with one another by a coupling sleeve 16 having major portions embracing the cylindrical ends 21. Surrounding the midlength of the coupling sleeve 16 is a closure sleeve 17 having a snug rotary fit about the sleeve 16.

Each of the members 15, 16 and 17 is slit or split lengthwise from end to end thereof and is formed of a suitable semirigid plastic which may be transparent or opaque depending on service requirements.

The tubes 15 preferably have a hardness of R35 and the sleeves 16 and 17 have a hardness of about R90 on the Rockwell scale. If the closure 10 is to be transparent, butyrate is found to be highly satisfactory plastic. However, when the enclosure is required to be opaque, conical members 15 are preferably made of the same plastic material compounded with an opaque pigment whereas the remaining plastic components are preferably made of opaque ABS plastic composition of commercial grade.

Owing to the toughness and pronounced resilience of the material from which the various members are formed, each of the tubular members is forcibly expandable to widen the slit of each sufficiently to permit each to be assembled about the cable splice 11 from one lateral side of the splice. This expansion does not rupture the tubes nor exceed the field strength with the result that each resumes its former shape. Accordingly, the splice enclosure may be assembled about the splice after all splicing operations have been completed and at any later date the splice enclosure may be opened and removed and replaced following the same expansion and reclosure technique just mentioned.

Referring now to FIGS. 3 to 5, details of the strong joint between the edges of the slit 26 in tubes or tubular members 15 will be described. It will be noted that each of these tubes include integral radial external ribs 25 along the respective edges of the slit 26. As here shown, the ribs 25 project outwardly from the outer surface of tubes 15, but, if desired, these ribs may project inwardly thereby providing a lower height silhouette than that shown in FIG. 3. These locking ribs have a close sliding fit with cooperating locking grooves 27 along either side of a web 28 of the corresponding locking strip 18. Each locking strip 18 is extruded from a tough high-strength but resilient plastic having the same general physical characteristics as the tubular members 15, 16 and 17. The strips 18 are generally H-shaped in cross-section with the outer and inner legs thereof contoured to have a close sliding fit with the ribbed portions of the members 15, and serving to provide a substantially fluid-tight interlocking joint with the ribs 25. More particularly, the outer leg of each H-shaped locking strip 18 provides grooved outer flanges engaging the exterior of the corresponding tubular member 15 and snugly receiving the ribs 25, while the inner leg provides inner flanges engaging the inner periphery of the member 15 along opposite sides of the slit therein.

The assembly of the above described splice enclosure 10 is performed in the following manner. It will be understood that the cable splice 11 is completed in a manner well known to persons skilled in the cable splice art. As here shown, the spliced wires 30 are enclosed in suitable protective caps 31 and the shielding shrouds typically present in the cables 12 and 13 are electrically and mechanically interconnected by bonding assemblies 33 and interconnecting bonding bars or straps 34 in the manner described in detail in U.S. Pat. No. 3,781,461, issued Dec. 25, 1973.

The cable splice having been completed, the operator proceeds to wrap each of the cable sheaths with Buna tape to provide sealing collars 35 beyond the opposite ends of the splice proper. Thereafter, the two tapering tubular members 15 are assembled about the splice by expanding them until the widths of the slits 26 will receive the splice, or the cables 12 and 13, from one lateral side thereof. The locking strips 18 are then telescoped endwise over the locking ribs 25 and into the slits 26 from the larger ends of the members 15 so as to enclose the full lengths of the slits. As here shown, the adjacent ends of the locking strips 18 terminate substantially flush with the cylindrical ends 21 of the members 15.

Thereafter, the coupling sleeve 16 is expanded and assembled over the adjacent cylindrical ends 21 of the members 15 with its slit 37 receiving the inner ends of the locking strips 18. The sleeve 16 snugly embraces the exterior cylindrical surfaces of the tubes 15 and forms a fluid-tight seal with these surfaces.

The midportion of the slit 37 then forms a generally rectangular shaped charging port 38 for any suitable potting compound 40 which may be of a resinous type which polymerizes at room temperature to form a rigid waterproof hermetic seal with all internal surfaces enclosed by splice enclosure 10. Alternatively, and if it is desired to provide a readily re-enterable splice enclosure, the interior of the closure 10 is charged with a permanently nonsetting potting compound of gel-like consistency of the type disclosed in the aforementioned U.S. Pat. No. 3,781,461. This compound is charged into first one and then the other remote end of the closure with care being taken to avoid air pockets and cavities and in such a manner that the gel displaces the air through the port 38 as charging proceeds. Once the interior of the enclosure has been fully charged, the closure tube 17 is rotated approximately 180° to close the port 38.

It will also be understood that prior to the charging operation, the enclosure 10 is wrapped with sealing convolutions of tape 41 and 42. These hold the smaller diameter tapered ends firmly against the sealing collars 35 and the juxtaposed surfaces of the cable sheaths. The wrappings 42 likewise seal the ends of the coupling sleeve 16 to the tubes 15 and prevent any possibility of this sleeve expanding away from the tubes 15. It will also be understood that additional tape wrappings may be applied about the ends of the port cover tube 17 to prevent expansion and rotation of this member away from the port 38.

DESCRIPTION OF EXEMPLARY EMBODIMENT OF INVENTION. FIGS. 6 TO 8

Referring to FIGS. 6 to 8 of the drawings, illustrated therein are aligned cables 110 interconnected by a splice shown diagrammatically at 112. The cables 110 are interconnected by a strap assembly 114 bridging the splice 112.

The foregoing structure, which is conventional and thus need not be described further, is housed within a re-enterable enclosure 120 of the invention which is intended for underground or buried use, and which is thus filled with a charge 122 of a suitable removable potting compound which encapsulates the portions of the cables 110 within the enclosure, the splice 112 and the cable interconnecting assembly 114 to seal same from the elements.

Considering the re-enterable cable splice enclosure 120 of the invention in more detail now, it is similar to the enclosure 10 and includes two longitudinally split tubular end members 124, preferably formed of a suitable plastic, which are similar to the members 15 and which are relatively hard and rigid, but which are still sufficiently flexible that the edges of the slits 126 therein can be spread sufficiently to permit lateral application of the tubular end members to the respective cables 110. The tubular end members 124 have end portions 128 which converge axially away from each other to inside diameters at their extremities substantially equal to the external diameters of the cables 110. Complementary sealing collars 130 provide fluid tight seals between the cables 110 and the convergent end portions 128 of the tubular end members 124 on opposite sides of the splice 112 and interconnecting assembly 114.

External, substantially radial locking ribs 132 respectively extend longitudinally along the edges of the slit 126 in each tubular end member 124, substantially from the outer end of such member to the inner end thereof. The locking ribs 132 on each tubular end member 124 cooperate with a locking strip or slider 134 which, when installed, prevents circumferential expansion of the corresponding tubular end member.

More particularly, as best shown in FIG. 8, each locking strip 134 has what might be called a generally H-shaped cross sectional configuration and includes an outer leg comprising two outer flanges 136 and an inner leg comprising two inner flanges 138, the inner and outer flanges being interconnected lengthwise thereof at their respective junctions by a web 140. The inner surfaces of the outer flanges 136 have longitudinal grooves 142 therein adjacent the web 140 to receive the respective locking ribs 132 on the corresponding tubular end member 124. Each locking strip 134 is installed on its corresponding tubular end member 124 by sliding it longitudinally from the outer extremity of the corresponding tubular end member, with the web 140 in the corresponding slit 126, and with the respective outer flanges and inner flanges 136 and 138 positioned as best shown in FIG. 8 of the drawings. As will be apparent, the locking strips 134 prevent circumferential expansion of the tubular end members 124 when thus installed.

Completing a general description of the enclosure 120, it also includes a longitudinally split coupling sleeve 146 formed of a suitable plastic material which is relatively hard and rigid, but nevertheless sufficiently flexible to permit lateral application over one of the cables 110. Upon assembly of the enclosure 120, the ends of the coupling sleeve 146 are telescoped over the inner ends of the tubular end members 124 with the coupling sleeve 146 encompassing the cable splice 112. The longitudinal slit 148 in the coupling sleeve receives the inner ends of the locking strips 134, as best shown in FIG. 6. The inner ends of the locking strips 134 are spaced apart axially a sufficient distance to provide a charging port 150 defined generally by the edges of the slit 148 and the inner ends of the locking strips 134. After the enclosure 120 has been installed around the adjacent ends of the cables 110, the splice 112 and the interconnecting assembly 114, in the field in the manner described, the charge 122 of encapsulating or potting compound may be introduced into the enclosure 120 through the charging port 150. The encapsulating or potting compound is of a type which can be removed when re-entry into the enclosure 120 is necessary for any reason. For example, the compound may be of a type which remains in a gel-like state, or it may be of a type which sets up into a solid state, but which crumbles readily under finger pressure for easy removal.

Finally, the enclosure 120 includes a valve 152 for closing the charging port 150 after encapsulation or potting of the elements within the enclosure. Instead of being a longitudinally slit or split closure sleeve embracing the coupling sleeve 146, as in the embodiment of FIGS. 1 to 5, the valve 152 is simply a closure of a size to be snapped into and close the charging port 150. More particularly, the inner surface of the closure 152 is provided with longitudinally spaced, hook-shaped detents 154 adapted to snap past the inner ends of, and engage the inner surfaces of the inner ends of, the tubular end members 124 on opposite sides of the slits 126 therein. The ends of the closure 152 abut the inner ends of the locking strips 134. Thus, a substantially fluid-tight closure 152 for the charging port 150 is provided, and one which can be installed very simply merely by snapping it into place. It will be understood that, when re-entry is desired for any reason, the closure 152 can be released readily by axially moving the tubular members 124 apart slightly, as will be clear from FIG. 7 of the drawings. Thus, the enclosure 120 is essentially similar to the enclosure 10, except for the fact that the closure 152 replaces the valve sleeve or closure sleeve 17.

DESCRIPTION OF EXEMPLARY EMBODIMENT OF INVENTION, FIGS. 9 TO 13

In these figures of the drawings is shown an enclosure 220 which is assembled about the cables 110, the splice 112 and the interconnecting assembly 114 and which is similar in many respects to the enclosure 120. Consequently, the same reference numerals will be used in connection with the enclosure 220 as were used in connection with the enclosure 120, for corresponding parts.

The enclosure 220 is intended for aerial installation, as on telephone cables 110 carried by a suitable supporting cable 156, usually made of wire. In the enclosure 220, the coupling sleeve 146 is provided with laterally spaced, longitudinal ribs 158 providing therebetween a longitudinal groove 160 adapted to receive the supporting cable 156 and located opposite the slit 148 in the coupling sleeve. Suitable clamps or clamping bands 162 extending around the enclosure 220 and the supporting cable 156 connect the enclosure to the supporting cable.

Since the enclosure 220 is intended to be utilized in an aerial environment, the charge 122 of encapsulating or potting compound may be omitted since the possibility of entry of moisture is minimized in an aerial installation. The enclosure 220 is mounted on the supporting cable 156 with the locking strips 134 lowermost and, should any water enter the enclosure, it drains out through holes 164, FIG. 13, in the end members 124 adjacent the locking ribs 132 thereon. It will be understood that there are two rows of longitudinally spaced drain holes in each tubular member 124 extending along the respective locking ribs 132. As will be apparent, water escaping through the drain holes 164 and landing on the outer flanges 136 of the locking strips 134 can flow longitudinally to the ends of the locking strips for ultimate escape. With the locking strips 134 located at the bottom of the enclosure 220, and with the slit 148 in the coupling sleeve 146 located at the bottom, the possibility of rain water, or the like, entering the enclosure 220 in the first place is minimized.

Since the enclosure 220 preferably does not contain a charge of encapsulating or potting compound, the charging port 150 of the enclosure 120 is omitted by positioning the inner ends of the tubular members 124 and the inner ends of the locking strips 134 in abutting relation, as suggested in FIG. 10 of the drawings. To insure and maintain abutting of the inner ends of the tubular members 124, these tubular members are provided with external detents 166 insertable into complementary detent openings 168 in the coupling sleeve 146, as shown in FIGS. 10 and 11 of the drawings. The detents 166 have radial surfaces 170 engageable with corresponding edges of the detent openings 168 to positively lock the tubular members 124 relative to the coupling sleeve 146 with the inner ends of the tubular members 124 in abutting relation. (As shown in FIGS. 10, 11 and 12, the coupling sleeve 146 is also provided with alternatively usable detent openings 172 which are respectively located longitudinally outwardly of the detent openings 168 and which are adapted to receive the respective detents 166 when it is desired to axially space the inner ends of the tubular members 124 apart to form the charging port 150 of the previously-described enclosure 120, this condition being shown in FIG. 12. Thus, the detents 166 and the detent openings 168 and 172 permit the same enclosure parts to be used to provide the charging port 150, or to omit same.)

Although exemplary embodiments of the invention have been disclosed for illustrative purposes, it will be understood that various changes, modifications and substitutions may be incorporated in such embodiments without departing from the invention as hereinafter claimed.

I claim as my invention:

1. An enclosure kit for spliced ends of cables, comprising two longitudinally slit tubular members having tapered outer ends and cylindrical inner ends, a longitudinally slit coupling sleeve the ends of which are respectively telescopically connectible to said inner ends of said tubular members, two H-shaped locking strips slidably insertable into the slits in said tubular members from the outer ends thereof substantially to the inner ends thereof, said tubular members and said coupling sleeve being flexible and resilient so that the slits thereof may be spread to permit lateral insertion over the cable splice, said inner ends of said tubular members subsequently being telescopically connectible to the ends of said coupling sleeve, and said locking strips subsequently being insertable longitudinally into said slits in said tubular members from the outer ends of said tubular members substantially to said inner ends thereof, the edges of said slits in said tubular members and said locking strips having cooperable means thereon for preventing lateral spreading of the edges of said slits in said tubular members after insertion of said locking strips thereinto, the lengths of said locking strips being substantially equal to the lengths of said tubular members, and said tubular members and said coupling sleeve having cooperable detent means thereon for holding said inner ends of said tubular members and said locking strips in either axially spaced or axially abutting relationship.

2. An enclosure kit for spliced ends of cables, comprising two tubular members having tapered outer ends and cylindrical inner ends and a coupling sleeve the ends of which are respectively telescopically connectible to said inner ends of said tubular members, said tubular members and said coupling sleeve having cooperable detent means thereon for holding said inner ends of said tubular members in either axially spaced or axially abutting relationship.

* * * * *